US011953369B2

United States Patent
Bai

(10) Patent No.: US 11,953,369 B2
(45) Date of Patent: Apr. 9, 2024

(54) QUANTITY MEASUREMENT METHOD BASED ON WEIGHING

(71) Applicant: Yang Bai, Shanghai (CN)

(72) Inventor: Yang Bai, Shanghai (CN)

(*) Notice: Subject to any disclaimer, the term of this patent is extended or adjusted under 35 U.S.C. 154(b) by 484 days.

(21) Appl. No.: 17/263,424

(22) PCT Filed: Jul. 26, 2019

(86) PCT No.: PCT/CN2019/097854
§ 371 (c)(1),
(2) Date: Jan. 26, 2021

(87) PCT Pub. No.: WO2020/024873
PCT Pub. Date: Feb. 6, 2020

(65) Prior Publication Data
US 2021/0310855 A1  Oct. 7, 2021

(30) Foreign Application Priority Data
Jul. 30, 2018  (CN) .......................... 201810854768.3

(51) Int. Cl.
*G01G 23/01* (2006.01)
*G01G 19/42* (2006.01)
*G01G 23/44* (2006.01)

(52) U.S. Cl.
CPC ............. *G01G 23/01* (2013.01); *G01G 19/42* (2013.01); *G01G 23/44* (2013.01)

(58) Field of Classification Search
CPC ........ G01G 19/42; G01G 19/44; G01G 23/01; G01G 23/44
See application file for complete search history.

(56) References Cited

U.S. PATENT DOCUMENTS

| 4,316,516 A | * | 2/1982 | Kupper | ................ G01G 23/163 177/25.14 |
| 4,412,298 A | * | 10/1983 | Feinland | .............. G01G 23/163 177/25.14 |

(Continued)

FOREIGN PATENT DOCUMENTS

| CN | 101650215 A | 2/2010 |
| CN | 101963525 A | 2/2011 |

(Continued)

OTHER PUBLICATIONS

"Least Squares Fitting" from MathWorld—A Wolfram Web Resource; at <https://mathworld.wolfram.com/LeastSquaresFitting.html> copyright 1999-2023, last updated Aug. 18, 2023.*

*Primary Examiner* — Randy W Gibson
(74) *Attorney, Agent, or Firm* — Muncy, Geissler, Olds & Lowe, P.C.

(57) ABSTRACT

A method for calculating the quantity of goods based on weighing includes the following steps: Step 1, Weight Conversion; accurately convert the weighing reading to the corresponding weight value W; Step 2, Weight Scaling; that is, the conversion of weight units; Step 3, Zero Point Correction; calibrate the weight reading; Step 4, Tare; remove the weight of non-goods objects in the weight value; Step 5, Anti-Mutation Filtering; anti-mutation filtering on the weight value; Step 6, Quantity Conversion; convert the weight value after calibration and correction of steps 1 to 5 above into the approximate (rough) quantity of the goods; Step 7, Quantity Calibration; calibrate the rough quantity of the above-mentioned goods.

2 Claims, 3 Drawing Sheets

(56) References Cited

U.S. PATENT DOCUMENTS

| | | | | |
|---|---|---|---|---|
| 4,535,854 A | * | 8/1985 | Gard | G01G 23/01 |
| | | | | 177/1 |
| 4,630,696 A | * | 12/1986 | Kemnitz | G01G 23/01 |
| | | | | 177/1 |
| 4,760,539 A | * | 7/1988 | Amacher | G01G 23/01 |
| | | | | 73/1.13 |
| 2003/0000757 A1 | | 1/2003 | Ishida et al. | |
| 2006/0058975 A1 | * | 3/2006 | Hamamoto | G01G 23/01 |
| | | | | 177/185 |
| 2021/0156727 A1 | * | 5/2021 | Bai | G01G 23/14 |

FOREIGN PATENT DOCUMENTS

| | | |
|---|---|---|
| CN | 203298856 U | 11/2013 |
| CN | 204807179 U | 11/2015 |
| CN | 109063325 A | 12/2018 |

\* cited by examiner

QUANTITY MEASUREMENT METHOD BASED ON WEIGHING

BACKGROUND OF THE INVENTION

1 Field of the Invention

The invention relates to a method for calculating the quantity of goods, in particular to a method for calculating the quantity of goods based on weighing.

2 The Prior Arts

With the gradual popularization of Internet of Things (IoT) technology and intelligent systems, the method of adding load cells to each pallet (cargo position/cargo tray, refers to the area or container where the goods are stored) and counting the quantity of goods in the pallet in real time by weight is becoming a more popular development direction in recent years. Such solutions usually consist of load cells, digital-to-analog conversion (ADC) modules, and industrial computers. The load cell is usually installed under the pallet to convert the weight into the corresponding voltage or current value; the digital-to-analog conversion module measures the voltage change of the load cell in real time and converts it into a digital signal; The industrial computer reads the latest weighing naked reading (ADC naked value) from the digital-to-analog conversion module, converts it into a weight unit, and further completes the quantity statistics.

The above solution has the advantages of low cost, high reliability, good environmental tolerance, and simple maintenance. But at the same time, the solution also has the following shortcomings:

1. The accuracy of weight conversion: When converting from ADC naked value to weight, usually only a two-point linear calibration algorithm is used, and the conversion accuracy is insufficient.
 2. Weight scaling problem: The unit after weight conversion may be inconvenient for the actual operation of personnel (for example, when the weight conversion calibration uses "gram" as the unit, the actual operation may be more convenient to use "ton").
 3. Zero offset deviation problem: The load cell may have permanent or semi-permanent mechanical deformation (creep) due to long-term load, or its zero point measurement may be deviated due to environmental factors such as condensation, temperature changes, falling dust, and sand. Resulting in inaccurate measurement readings. The existing manual calibration technology requires manual operation and measurement for this, wasting a lot of labor costs, and causing business interruption. At the same time, there are also problems such as long calibration intervals, it is difficult to maintain long-term stability and accuracy of weighing readings, and manual operations are likely to cause greater errors.
 4. Tare problem: The system needs to be able to sense and automatically remove the weight of the baskets and other containers used to hold the goods on the pallet.
 5. Mutation problem: Due to the material and technology of modern load cells, its full-scale voltage is usually only a few millivolts (mV), which is very weak. Therefore, it is extremely susceptible to electromagnetic interference from the external environment, resulting in high jitter and error; On the other hand, the pallet itself may also be moved, and factors such as inertia and centrifugal force generated during the movement will also cause the weighing reading to change instantly. These mutations (sudden changes) can lead to inaccurate weighing readings and quantity measurement.

For example: In a typical modern warehouse scene (a warehouse can hold multiple shelves (racks) at the same time, and each shelf can contain multiple pallets), everywhere is full of WIFI, mobile phone signals (3G/4G/5G), Lora, Zigbee, and other radio frequency interference, as well as electromagnetic interference such as power frequency interference generated by various electromechanical equipment and AC transmission lines. At the same time, AGV vehicles commonly used in modern storage will generate inertia (elevator effect) when lifting or lowering shelves, and when carrying shelves, they will also produce changes in inertia and centrifugal force due to bumps, steering and other reasons. All of these will affect the readings of the load cells on the corresponding pallets.

6. Tolerance problem: Since multiple items can be accommodated in one pallet at the same time, the tolerance (common difference) of each item may accumulate, resulting in incorrect calculation of the final product quantity.

For example: Consider a product A whose weight is 100 g, and its tolerance range is plus or minus 2%. That is: the weight of a single piece of qualified products ranges from 98 g to 102 g. If 200 such A items are stacked in a pallet (cargo space) at the same time, the legal weight range is between 19600 g and 20400 g after accounting for the tolerance. This means that even if we overcome the previous 5 problems and obtain accurate and stable weighing readings, the final calculated product quantity may still have a deviation of up to 8 pieces (plus or minus 4 pieces).

Obviously, the above-mentioned problems seriously hinder the effect of weighing-based pallet management technology in actual application scenarios.

SUMMARY OF THE INVENTION

The purpose of the present invention is to provide a method for calculating the quantity of goods based on weighing, which significantly improves the accuracy and stability of the pallet management technology based on weighing in actual work scenarios.

In order to achieve the above objective, the technical solution of the present invention is:

A method for calculating the quantity of goods (items) based on weighing, including the following steps:

Step 1, Weight Conversion; accurately convert the weighing reading to the corresponding weight value W;
   Step 2, Weight Scaling; that is, the conversion of weight units;
   Step 3, Zero Point Correction; calibrate the weight reading;
   Step 4, Tare; remove the weight of non-goods objects in the weight value;
   Step 5, Anti-Mutation Filtering; anti-mutation filtering on the weight value;
   Step 6, Quantity Conversion; convert the weight value after calibration and correction of steps 1 to 5 above into the approximate (rough) quantity of the goods;
   Step 7, Quantity Calibration; calibrate the rough quantity of the above-mentioned goods.

Further, the conversion formula in step one is: $W=f(\{S\}, ADC)$, where W is the weight value, f represents the linear or non-linear interpolation algorithm to be used, and $\{S\}$ represents the pre-calibrated Sampling collection, and the ADC represents the naked weighing readings.

Further, the calculation formula of the second step is: SW=WS*W(WU); where SW is the weight after scaling, WS is a pre-designated variable coefficient, and WU is the unit.

Further, the zero point correction in the step 3 is zero point automatic calibration: when the system detects that the current pallet has been emptied, but the weighing reading has not returned to zero, after at least a preset number of consecutive sampling readings fall within the range of the weighing reading threshold ZPT, the ZPCS continuous samples are averaged in a weighted form, and save this value as the new zero point offset compensation amount (ZPO) parameter.

Further, the zero point correction in the step 3 is the zero point automatic follow-up calibration: when the pallet is in a stable state, and after at least a preset number of consecutive sampling readings' variation are within the range of [ZPTMIN, ZPTMAX], then accumulate the mathematical average or weighted average of consecutive ZPTCS sampling variations to the zero point offset compensation amount (ZPO). Among them ZPTMAX is the maximum following step value, ZPTMIN is the minimum following step value.

Further, the zero point correction in the step 3 is the zero point automatic follow-up calibration: when the pallet is in an unstable state, it automatically records and adjusts the normal weight changes caused by the goods shipment, purchase, etc. (shipping causes the corresponding pallet to lose weight, and the purchase causes the corresponding pallet to increase in weight). On this basis, if at least a preset number of consecutive sampling readings are detected, and their differences outside of normal changes are all within the range of [ZPTMIN, ZPTMAX], then add the mathematical average or weighted average of consecutive ZPTCS sampling variations to the zero point offset compensation amount (ZPO). Among them ZPTMAX is the maximum following step value, ZPTMIN is the minimum following step value.

Further, the fourth step is to remove the weight of non-goods such as basket containers in the weight value. The tare operation is realized by subtracting a pre-specified tare parameter BW from the current weight value. The value after subtracting the BW parameter is the pure product weight value at the current pallet.

Further, in the fifth step, the problem of mutations (sudden changes) in weighing readings caused by electromagnetic interference, inertia, centrifugal force and other phenomena is eliminated. The anti-mutation filtering process is mainly controlled by parameters such as the anti-mutation maximum range AMMAX, the anti-mutation minimum range AMMIN, the anti-mutation ratio range AMR, and the anti-mutation sampling number AMS.

Further, the quantity conversion formula in the step 6 is: the rough quantity of the goods P=the weight value after step 5/the standard gross weight of the goods GSW.

Further, in the seventh step, the range of the cumulative error tolerance CAT is calculated by determining the full pallet capacity CAP, the standard gross weight of the goods GSW, the tolerance (common difference) range APU, the maximum cumulative error CAMAX, the minimum cumulative error CAMIN, and the error tolerance ATF; Then use the cumulative error tolerance CAT to further calibrate the rough quantity of goods calculated in the sixth step.

Compared with the prior art, the present invention has the following advantages:

The present invention significantly improves the accuracy and stability of the weighing-based goods management technology in actual work scenarios.

DETAILED DESCRIPTION OF THE PREFERRED EMBODIMENT

The embodiments of the present invention are further described below in conjunction with the drawings.

Figure 1:
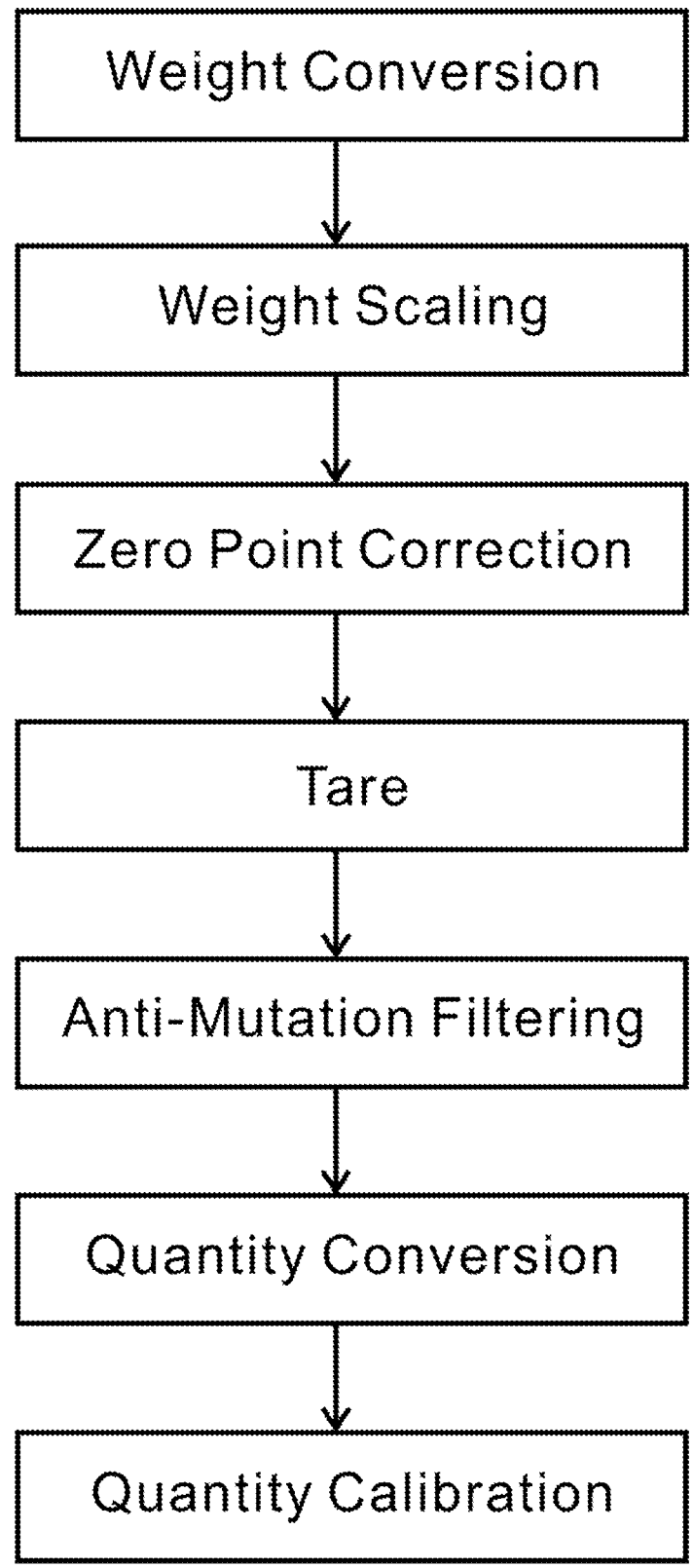
FIG. 1 is a schematic diagram of the process of the present invention.

Embodiment: please refer to FIG. 1,

A method for calculating the quantity of goods based on weighing, including the following steps:

Step 1, Weight Conversion; accurately convert the weighing reading to the corresponding weight value W;

Step 2, Weight Scaling; that is, the conversion of weight units;

Step 3, Zero Point Correction; calibrate the weight reading;

Step 4, Tare; remove the weight of non-goods objects in the weight value;

Step 5, Anti-Mutation Filtering; anti-mutation filtering on the weight value;

Step 6, Quantity Conversion; convert the weight value after calibration and correction of steps 1 to 5 above into the approximate quantity of the goods;

Step 7, Quantity Calibration; calibrate the rough quantity of the above-mentioned goods.

Among them, the quantity conversion formula in step 6 is: the rough quantity of the goods P=the weight value after step 5/the standard gross weight of the goods GSW.

Figure 2:
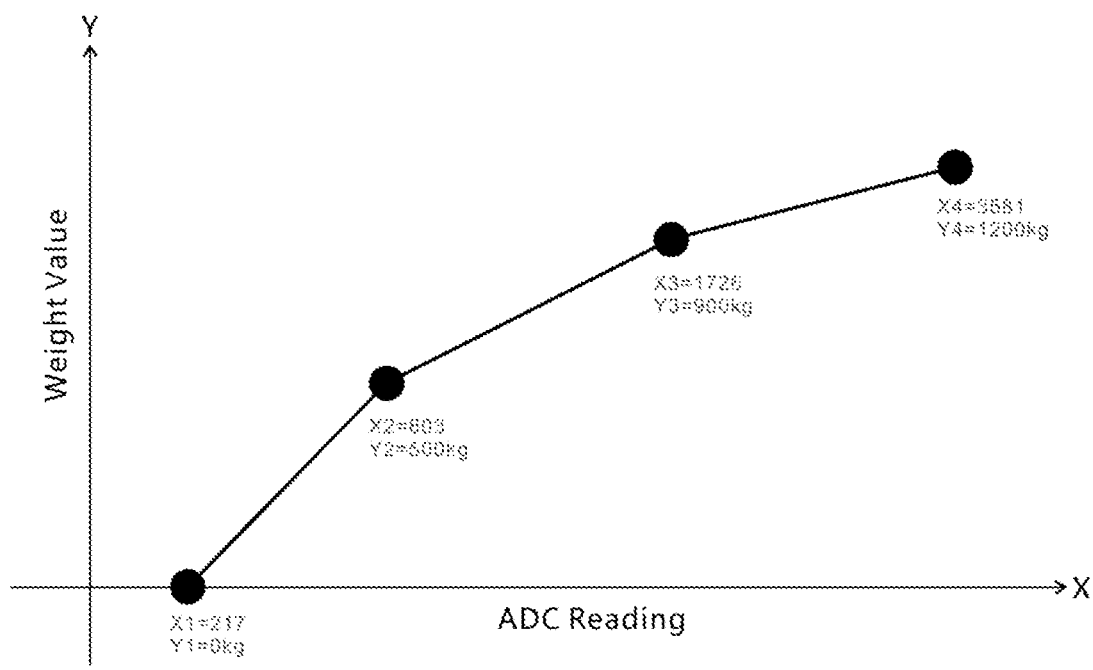
FIG. 2 is an example of a linear interpolation algorithm for weight conversion of the present invention.
Figure 3:
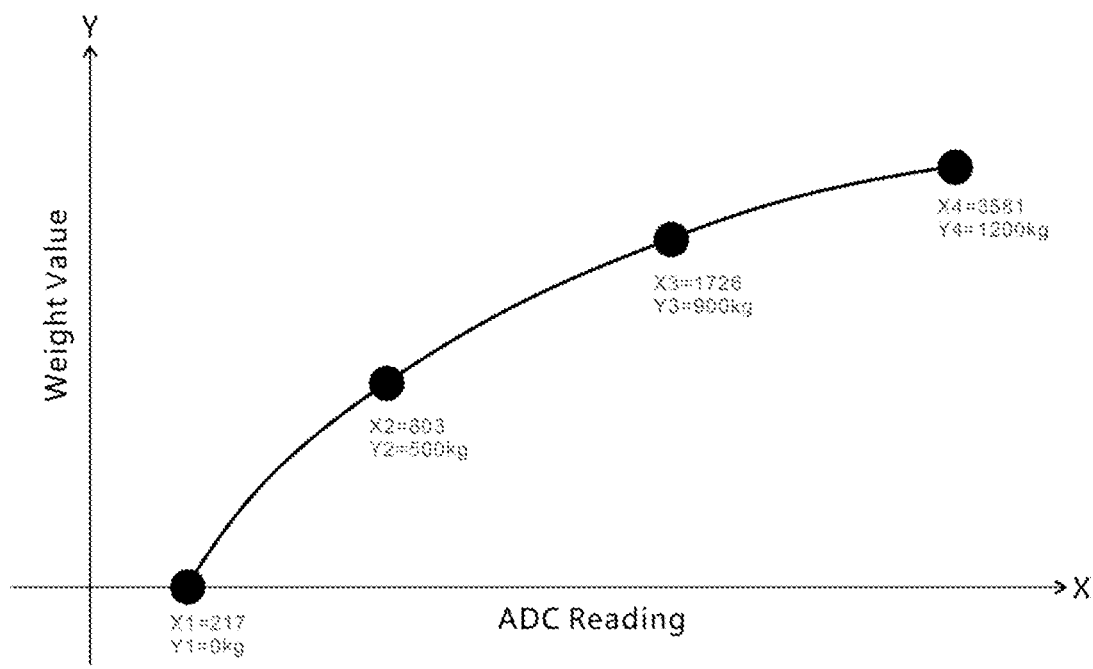
FIG. 3 is an example of a non-linear interpolation algorithm for weight conversion of the present invention.

Preferably, because the traditional two-point calibration linear conversion cannot truly reflect the physical characteristics of the load cell, the accuracy of the weight conversion result is insufficient. Therefore, the conversion formula in step 1 is: W=f({S}, ADC), where W is the weight value, f represents the linear or non-linear interpolation algorithm to be used, and {S} represents the pre-calibrated Sampling collection, and the ADC means weighing data (naked reading). Please refer to FIG. 2 and FIG. 3. This conversion method supports any number of weighing data samples S (S1, S2, S3, etc.), where each sample includes the ADC naked reading X and the corresponding actual weight value Y (S1=[X1,Y1], S2=[X2,Y2], S3=[X3,Y3] . . . ). Combined with linear interpolation (piecewise function) or non-linear interpolation (smooth curve) algorithm, the naked ADC reading can be accurately converted to the corresponding weight value.

Preferably, the weight scaling in step 2 is essentially the conversion of the weight unit, which can be realized by multiplying the current weighing value by a pre-designated variable coefficient WS, the calculation formula is: SW=WS*W(WU); where SW is the weight after scaling, WS is the variable coefficient specified in advance, and WU is the unit (such as: tons, kilograms, pounds, grams, etc.).

Preferably, the zero point correction in step 3 is zero point automatic calibration. Zero point automatic calibration refers to the following process: when the system detects that the current pallet has been emptied, but the weighing reading has not returned to zero after the weight conversion and weight scaling steps, it automatically recalibrates the zero point compensation offset of the weighing reading, to help to weighing system reset to zero.

The specific zero point automatic calibration is mainly controlled by two parameters: weighing reading threshold ZPT and continuous sampling number ZPCS. Among them, the weighing reading threshold ZPT is used to ensure the maximum range of weighing readings when the pallet is empty (absolute value, ZPT can also be separately designated as ZPT+ and ZPT-: the maximum range of positive values and the maximum range of negative values); The continuous sampling number ZPCS specifies at least how many continuous sampling readings completely fall within the range specified by the ZPT parameter before performing the zero point automatic calibration process (it can be 1, indicating that continuous sampling is not required).

When the system detects that at least the preset number of continuous sampling readings (such as the number of continuous sampling ZPCS) falls within the range of the weighing reading threshold ZPT (indicating that the current pallet has been emptied), but the weighing reading has not returned to zero, then the ZPCS continuous samples are averaged in a weighted form, and save this value as the new zero point offset compensation value (ZPO). And in the future weight calculation process, the offset value is used to compensate the zero point deviation (creep) of the sensor.

For example: ZPT=30, ZPCS=20 means that when the weight value of at least 20 consecutive samples falls within the range of ±30, the zero point automatic calibration process will start. The specific automatic calibration process can be: take the average of the last 20 samples in a weighted form (For example: the newer the sample, the higher the weight; or the simple mathematical average, that is, the weight of all samples is 1; or the first sample shall prevail, that is, the weight of the first sample is 1, the subsequent samples weights are 0, etc.), and save this value as the new zero offset compensation (ZPO) parameter. Each new sample in the future will add a ZPO value to compensate for the zero point deviation after completing steps such as weight conversion and scaling.

Obviously, the ZPT value should be much smaller than the weight of the container or a single item (without container) on the basket (tare) on the pallet, otherwise it may lead to misjudgment (the weight of the basket or the product is incorrectly judged as zero point deviation). The recommended ZPT value should be less than 50% of the weight of the basket (tare) or single item (goods). A larger ZPCS value can protect the system from sudden disturbances (mutations) caused by electromagnetic signals, inertia, and centrifugal force.

Preferably, the zero point correction in step 3 is the zero point automatic follow-up calibration, Different from the zero point automatic calibration, the zero point automatic follow function can be activated automatically without emptying the pallet. The zero point auto-following function can perform real-time and dynamic calibration of the zero point deviation (drift) phenomenon on the current pallet caused by creep, environmental changes and other reasons under the premise that the pallet is in a stable (e.g.: the quantity of goods has not changed) or unstable (dynamics, e.g.: ongoing operations such as purchase and shipment, frequent changes in the quantity of goods, etc.) state.

The zero point automatic follow-up process is controlled by parameters such as the maximum follow step value ZPTMAX, the minimum follow step value ZPTMIN, and the number of continuous samples ZPTCS.

The maximum follow-up step value ZPTMAX determines the maximum acceptable weight change value (variation, the Delta) each time the zero-point automatic follow-up process occurs ("change value (variation)" refers to the difference (absolute value) between the current weight value and the last weight value after entering the steady state or the last time the zero point was automatically followed. ZPTMAX can also be designated as ZPTMAX+ and ZPTMAX-: the maximum range of positive values and maximum range of negative values).

The minimum follow up step value ZPTMIN determines the minimum weight change value (variation) range required to activate an automatic zero point follow-up process ("change value (variation)" is defined above; it is a absolute value and can be 0, which means that the minimum fluctuation range is not limited, and ZPTMIN can also be separately designated as ZPTMIN+ and ZPTMIN-: the minimum range of positive values and the minimum range of negative values).

Finally, the number of continuous samples ZPTCS specifies at least how many continuous sample readings whose absolute value of variation (delta) completely falls within the range specified by the [ZPTMIN..ZPTMAX] (When the absolute value is not used, it is: [ZPTMIN+..ZPTMAX+] or [ZPTMAX- . . . ZPTMIN-]) parameters before performing the zero point automatic following process (Can be 1, which means that continuous sampling is not required).

The specific calibration method is: when the pallet is in a stable state, and at least a preset number of continuous sampling readings (such as ZPTCS consecutive samples) fall within the range of [ZPTMIN, ZPTMAX], then add the mathematical average or weighted average of the ZPTCS continuous sampling variations to the zero point offset compensation (ZPO) value. And in the future weight calculation process, the offset value is used to compensate the zero point deviation (creep) of the sensor.

For example: assuming ZPTMIN=1.5, ZPTMAX=5, ZPTCS=100, ZPO=10. At this time, if the change value (Delta) of 100 consecutive samples is within [1.5..5] after the last time the quantity of goods has changed, then the weighted average of these 100 change values (assumed to be 2.5) is added to the ZPO parameter (new ZPO=12.5). Each new sample in the future will add this ZPO value to compensate for the zero drift (deviation) after the weight conversion and scaling steps are completed.

Conversely, when the pallet is in an unstable state, the change in the state must be compensated first. The method is: accumulate the difference between the current state and the previous state one by one to each continuous sample currently saved, or accumulate it to the current saved reference value.

For example: Suppose that the zero point auto-following process is started, and there are 10 valid continuous samplings, the current pallet weighing reading (after the processing of steps 1 to 5) is 200.5 g, and the quantity of goods is 10. And since the 11th sampling, its weighing reading has changed to 240.75 g, and the quantity of goods is 12. At this time, the state has changed (the number of goods has changed from 10 to 12, and the weight has increased by 40.25 g). In order to dynamically continue to track the zero point offset value, the value of the first 10 samples should be increased by 40.25 one by one, namely: for (int i=0; i<10, ++i){sample[i]+=40.25; }//C-like pseudo code, where "sample" is the sample set, and "i" is the sample subscript (counting from 0). To compensate for the non-biased weighing differences in the first 10 samples. Or, if the algorithm only retains a reference weight value (rather than retain a weighing reading for each sample), then 40.25 should be added to the reference weight value.

The zero point deviation (drift) caused by creep or environmental changes usually occurs gradually in small steps. Therefore, the ZPTMAX value can usually be set to a very small value relative to the effective range of the current sensor. This also helps prevent misjudgments in the system. Setting ZPTMIN to a non-zero value can not only prevent the system from starting the zero-point automatic follow-up process too frequently, but also protect the process from interference such as signals or other random fluctuations. A larger ZPTCS value can protect the system from mutations caused by electromagnetic interference, inertia, and centrifugal force.

Preferably, the step 4 is to remove the weight of non-goods objects such as basket containers in the weight value. The tare operation is realized by subtracting a pre-specified tare parameter BW from the current weight value. The value after subtracting the BW parameter is the pure product (goods) weight value at the current cargo position (pallet).

Preferably, the step 5 eliminates the problem of sudden changes (mutations) in weighing readings caused by electromagnetic interference, inertia, centrifugal force and other phenomena from the sampling.

The anti-mutation filtering process is mainly controlled by parameters such as the anti-mutation maximum range AMMAX, the anti-mutation minimum range AMMIN, the anti-mutation ratio range AMR, and the anti-mutation sampling number AMS.

The anti-mutation ratio range AMR is the maximum fluctuation ratio range between a set of consecutively arrived stable samples. It is considered that the samples of one group are stable and there is no mutation when the fluctuation ratio between different samples belong to that sampling group is within the specified range of AMR.

The maximum range of anti-mutation AMMAX determines the absolute upper limit of AMR. If the product of the current weight value and AMR is greater than this value, this value shall prevail (absolute value, AMMAX can also be separately designated as AMMAX+ and AMMAX−: the maximum range of positive values and the maximum range of negative values; it can be 0, which means the maximum range is not limited).

The minimum range of anti-mutation AMMIN determines the absolute lower limit of AMR. If the product of the current weight value and AMR is less than this value, this value shall prevail (Absolute value, AMMIN can also be separately designated as AMMIN+ and AMMIN−: the minimum range of positive values and the minimum range of negative values; it can be 0, meaning the minimum range is not limited).

The anti-mutation sampling number AMS specifies at least how many continuous sampling readings whose absolute value completely falls within the AMR ratio restricted by AMMAX and AMMIN before it is considered that no mutation has occurred (it can be 1, which means that continuous sampling is not required).

The specific filtering method is: output the mathematical average or weighted average of the AMS samples as the final weight value of the group of samples to the next step.

For example: AMR=0.1, AMMAX=30, AMMIN=1.5, AMS=5 means that every 5 consecutive samples form a group, if the fluctuation range of the 5 samples does not exceed ±10% (At the same time, for each weight value of the group of samples, if its product with 0.1 is less than 1.5, the lower limit of its fluctuation is forced to be set to 1.5, and if it is greater than 30, the upper limit of its fluctuation is forced to be set to 30), the group of samples is considered stable, and the final weight of the group of samples is the weighted average of the above 5 weight values.

Obviously, the fluctuation ratio range restricted by AMR ensures the relative stability of the data. AMMAX helps limit the maximum allowable range of reading fluctuations when the pallet is heavily-loaded (the number of goods is large, the weight value is large), to prevent the phenomenon that the absolute value is still too large (too insensitive) after the proportional limit; On the contrary, AMMIN helps limit the allowable minimum fluctuation range of the reading when the pallet is lightly-loaded (the number of goods is small, the weight value is small), and prevents the phenomenon that the absolute value is too small (too sensitive) after the proportional limit. A larger AMR value can protect the system from mutations caused by electromagnetic interference, inertia, and centrifugal force.

Preferably, the quantity conversion process in step 6 is specifically: converting the weight value after the calibration and correction of steps 1 to 5 above into a rough quantity. The conversion process is:

Rough quantity of current pallet goods P=current pallet weight value/current standard gross weight of the goods (GSW) on the pallet.

Figure 4:
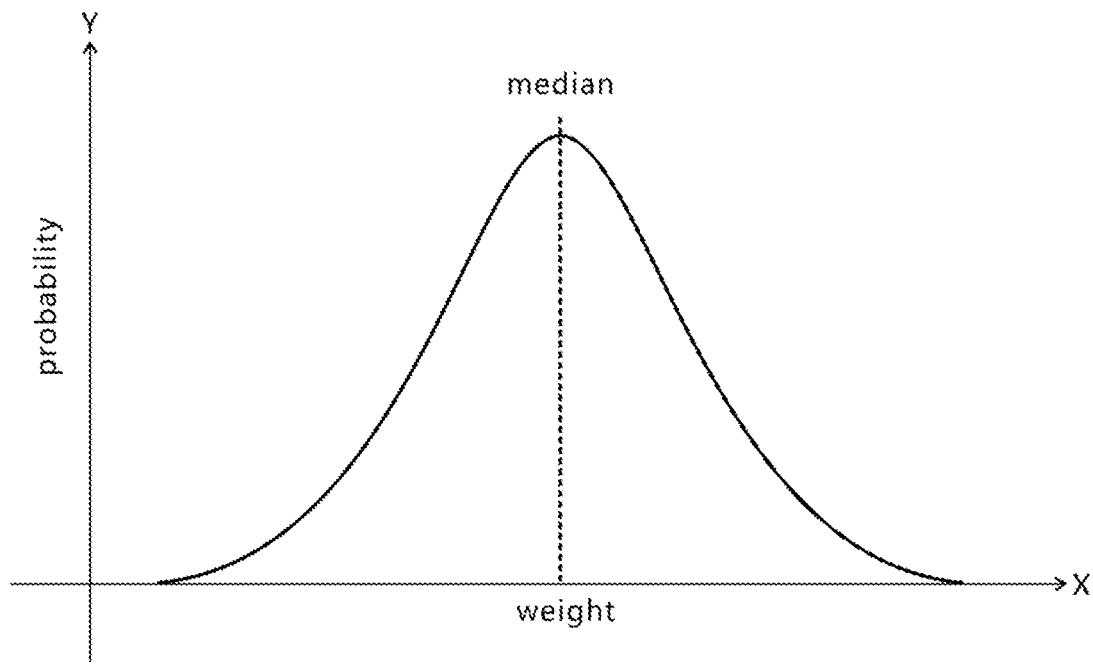
FIG. 4 is a schematic diagram of the position of the standard gross weight GSW in the weight distribution of goods in the quantity conversion of the present invention.

Please refer to FIG. 4, where the "standard gross weight of the goods" GSW refers to: The standard value of the gross weight of the goods obtained through actual weighing tests or through trusted channels. It should be able to meet the median under the condition of normal distribution after taking into account the influence of tolerance (common difference). This means that if one piece is randomly selected from N pieces of this model product, then this piece of goods: 1. The probability of weight higher than GSW and the probability of weight lower than GSW should be basically equal (ie: both are 50%); 2. At the same time, the magnitude of its weight higher than GSW should also be equal in probability to its magnitude lower than GSW.

For example: If the GSW of a product is 100 g, its standard tolerance is 2%. Randomly select one piece from 1,000 pieces of this type of goods, then: 1. The probability that the weight of the product is greater than 100 g or less than 100 g is both 50%; 2. And the probability that its weight is 99 g should be equivalent to the probability that its weight is 101 g.

The approximate value of GSW can be obtained by randomly selecting M pieces from one or more batches of goods of the same model and weighing, and calculating the average value, namely:

GSW≈M total weight of random goods/M.

Obviously, GSW is one of the key indicators to ensure accurate quantity conversion. The closer it is to the median of the normal distribution described above, the more it can eliminate the cumulative error in the case of "a pallet containing multiple items of the same model at the same time", making the quantity calculation more accurate.

It is conceivable that if a certain brand of instant noodles has a nominal weight of 100 g, and the standard tolerance is 3%. However, because manufacturers are chasing profits, the weight of all their products after actual measurement are distributed between 97 g and 98 g. At this time, if the GSW value of the product is set to the factory's nominal 100 g, when 100 packs of instant noodles are placed in this pallet (cargo position), the actual measured result may only be 97 packs.

Therefore, GSW usually needs to be obtained through actual measurement or other credible authoritative channels.

Although after introducing GSW in step 6, the quantity calculation can be completed more accurately. However, small deviations such as ±1 pieces cannot be avoided. In order to further enhance the accuracy of quantity statistics, after the quantity conversion is performed, a further quantity fine calibration process is still required. The quantity calibration process is more complicated. Generally speaking, the main action of the process is to reasonably control the acceptable cumulative tolerance (weight value) of all the goods in the current position (pallet), and based on this, make necessary corrections to the quantity conversion result produced in the previous step.

Preferably, in step 7, the main parameters involved in the quantity calibration process include:

Full capacity CAP: the current full capacity of the pallet (the number of items, 0 means no limit).

Tolerance range APU: The maximum acceptable tolerance range (percentage or absolute weight) of each item relative to its median.

Maximum cumulative error CAMAX: the maximum acceptable cumulative error upper limit of all goods of the current pallet (it can be a percentage relative to GSW, or an absolute value of weight, 0 means no maximum limit).

Minimum cumulative error CAMIN: the minimum acceptable cumulative error lower limit of all goods in the current pallet (it can be a percentage relative to GSW, or the absolute value of weight, 0 means no minimum limit).

Error tolerance ATF: the tolerance of the current pallet to error. Geometrically speaking, this parameter, together with the current full capacity of the pallet, determines the steepness of the curve or straight line that gradually limits the cumulative error. The larger the value, the higher the tolerance for errors (the smoother the curve, or the smaller the absolute value of the slope of the straight line, 1 means no adjustment).

And the rough quantity P and the standard gross weight GSW obtained in step 6.

By imposing reasonable restrictions on the above aspects, a reasonable cumulative error tolerance CAT range can be calculated. Then use CAT to perform further calibration on the actual quantity of goods, which significantly improves the accuracy of the system.

Figure 5:
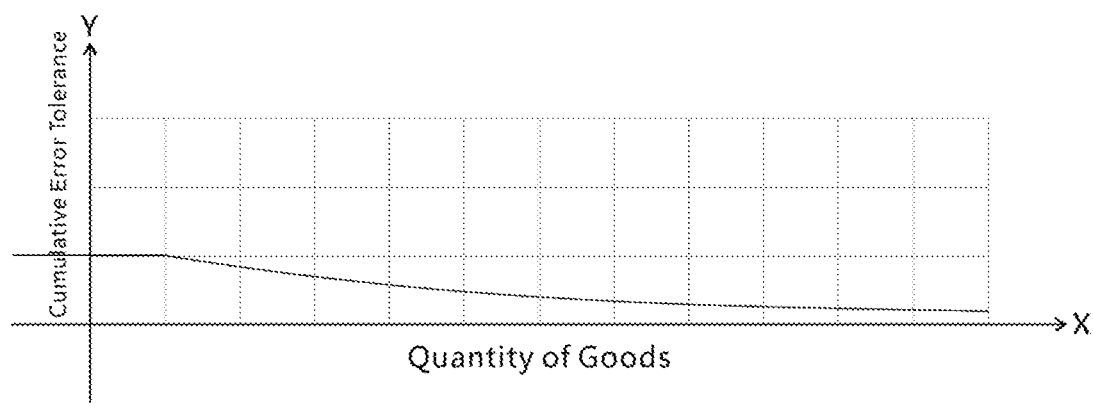
FIG. 5 is a schematic diagram of the "inverse sigmoid" smooth adjustment curve in the preferred embodiment of the quantity calibration of the present invention.

For example, this process can combine various parameters and data to give an "inverse sigmoid" smooth adjustment curve as shown in FIG. 5 for the acceptable cumulative error of the current pallet, the CAT calculation method based on "inverse sigmoid smooth curve" is:

1. Calculate the "inverse sigmoid curve" smooth descent factor ISF: $ISF=1/(CAP*ATF)$.
2. Calculate the "inverse sigmoid curve" scaling compensation value ISC: $ISC=1/(1/(1+\exp(ISF)))$.
3. Bring in the rough quantity value P obtained in step 6, and calculate the error tolerance intermediate coefficient ISITF: $ISITF=(1/(1+\exp(P*ISF)))*ISC$.

And in the worst case, the proportional value ISWCT of the largest unit (number of pieces) that may cause the cumulative error: $ISWCT=P*APU$.

4. Calculate the proportional value ISCWCT of the maximum cumulative error unit after being restricted: $ISCWCT=ISITF*ISWCT$.
5. Calculate the common difference tolerance CAT:
   a) If CAMIN is not zero and ISCWCT<CAMIN (at this time, CAMIN should be converted to a percentage relative to GSW), then: $CAT=CAMIN/ISWCT$. This ensures that the cumulative tolerance range meets the minimum range constraints specified by CAMIN.
   b) If CAMAX is not zero and ISCWCT>CAMAX (at this time, CAMAX should be converted to a percentage relative to GSW), then: $CAT=CAMAX/ISWCT$. This ensures that the cumulative tolerance range meets the maximum range constraint specified by CAMAX.
   c) Otherwise, it means that ISCWCT is between [CAMIN..CAMAX], and CAT is controlled by the above "inverse sigmoid curve": $CAT=ISITF$.
6. Calculate the actual allowable pallet total tolerance (percentage) ISRPA: $ISRPA=CAT*APU$.
7. Calculate the actual error tolerance range (weight value) ISAAR: ISAAR=the weight value after calibration and correction in steps 1 to 5 above * ISRPA.
8. Calculate the remainder of the weighing value P (P is an integer) obtained in step 6: ISWCO: ISWCO=the weight value after calibration and correction in steps 1 to 5 above–$P*GSW$.
9. If ISWCO+ISAAR>GSW, compensation will be executed: $P=P+1$, which is the value of the quantity of goods plus 1.

Note: The mathematical formula used in this article is basically the same as the mathematical expression syntax in C language, namely: "+" means addition, "−" means subtraction, "*" means multiplication, "/" means division, exp means "Power operation with natural number e as the base", for example: exp(10) means 10th party of e, exp(N) means the N-th party of e.

It should be pointed out that the above example only lists a reasonable application of various calibration methods including P, GSW, CAP, APU, CAMAX, CAMIN, ATF and other parameters. In fact, we can reasonably apply the above restriction methods in any number of ways. For example: replacing the natural number e in the above formula with pi or any other real number, replacing the power operation in the above formula with logarithmic operation, replacing the above nonlinear (curve) calculation with linear (straight line) calculation, and so on.

Therefore, all the calculation formulas and the "inverse sigmoid curve" algorithm mentioned in the above examples are only examples and do not have any limitation on the scope of the present invention.

It can be seen that, geometrically speaking, CAP and ATF are mainly used to control the smoothness of the tolerance curve (or the absolute value of the slope of the tolerance straight line). CAMIN and CAMAX are used to appropriately scale the curve to ensure that the pallet can maintain a reasonable CAT value under light load and heavy load conditions. And GSW and APU determine the actual value of the final error range.

In summary, the present invention is accurate in calculation and significantly improves the accuracy and stability of the weighing-based pallet (goods) management technology in actual work scenarios.

What is claimed is:

1. A method for calculating the quantity of goods based on weighing, comprising:
performing a zero-point correction method that calibrates weight reading, wherein the zero point correction method is zero point automatic follow-up calibration;
when a pallet is in an unstable state, automatically recording and adjusting normal weight changes caused by shipment and purchase of goods,
checking the weight of the goods; and
if after compensating for the normal weight change, delta of at least a preset number of consecutive sampling readings after the compensation falls within a range of [ZPTMIN, ZPTMAX], accumulating a mathematical average or a weighted average of consecutive sampling variations to a zero point offset compensation amount, where ZPTMAX is a maximum following step value, and ZPTMIN is a minimum following step value.

2. The method for calculating the quantity of goods based on weighing according to claim 1, further comprising performing an anti-mutation filtering method that performs anti-mutation filtering on the weight value, wherein the weight value is controlled by a limitation of an anti-mutation maximum range (AMMAX), an anti-mutation minimum range (AMMIN), an anti-mutation ratio range (AMR) and an anti-mutation sampling number (AMS) parameters.

* * * * *